United States Patent
Natsume (10) Patent No.: US 11,901,849 B2
(45) Date of Patent: Feb. 13, 2024

(54) WIPER DEVICE

(71) Applicant: DENSO CORPORATION, Kariya (JP)

(72) Inventor: Yohei Natsume, Kariya (JP)

(73) Assignee: DENSO CORPORATION, Kariya (JP)

( * ) Notice: Subject to any disclaimer, the term of this patent is extended or adjusted under 35 U.S.C. 154(b) by 718 days.

(21) Appl. No.: 17/047,581

(22) PCT Filed: Mar. 28, 2019

(86) PCT No.: PCT/JP2019/013745
§ 371 (c)(1),
(2) Date: Oct. 14, 2020

(87) PCT Pub. No.: WO2019/208094
PCT Pub. Date: Oct. 31, 2019

(65) Prior Publication Data
US 2021/0146886 A1    May 20, 2021

(30) Foreign Application Priority Data
Apr. 27, 2018  (JP) ................. 2018-087552

(51) Int. Cl.
*G05B 5/00*  (2006.01)
*G05D 23/00*  (2006.01)
(Continued)

(52) U.S. Cl.
CPC ............ *H02P 29/68* (2016.02); *B60S 1/0874* (2013.01); *H02M 7/53871* (2013.01); *H02P 27/08* (2013.01); *H02P 29/027* (2013.01)

(58) Field of Classification Search
CPC ........ H02P 29/68; H02P 27/08; H02P 29/027; B60S 1/0874
(Continued)

(56) References Cited

U.S. PATENT DOCUMENTS 5,525,878 A *  6/1996  Buchanan, Jr. ........... B60S 1/08
                                                                   318/443
10,682,984 B2 *  6/2020  Doi .......................... B60S 1/16
(Continued)

FOREIGN PATENT DOCUMENTS

JP  2000-280867 A  10/2000
JP  2004-237855 A  8/2004
(Continued)

OTHER PUBLICATIONS

Jun. 11, 2019 International Search Report issued in International Patent Application No. PCT/JP2019/013745.
(Continued)

*Primary Examiner* — Erick D Glass
(74) *Attorney, Agent, or Firm* — Oliff PLC (57) ABSTRACT

A wiper device including: a power supplying circuit including plural switching elements, the power supplying circuit supplying, to a wiper motor, voltage that has been converted in accordance with switching control of the plural switching elements; a temperature detecting section detecting a temperature relating to a temperature of at least one of the switching elements among the plural switching elements; a current detecting section detecting current flowing to any of the switching elements among the plural switching elements; and a control section that, in a case in which the current detected by the current detecting section exceeds a limit current at the temperature detected by the temperature detecting section, carries out switching control of the switching elements such that the voltage supplied to the wiper motor decreases.

4 Claims, 8 Drawing Sheets

(51) Int. Cl.
*H02H 7/08* (2006.01)
*H02P 1/04* (2006.01)
*H02P 29/68* (2016.01)
*B60S 1/08* (2006.01)
*H02M 7/5387* (2007.01)
*H02P 27/08* (2006.01)
*H02P 29/024* (2016.01)

(58) Field of Classification Search
USPC .......................................................... 318/472
See application file for complete search history.

(56) References Cited

U.S. PATENT DOCUMENTS

| | | | | |
|---|---|---|---|---|
| 2008/0100244 | A1* | 5/2008 | Amagasa | B60S 1/08 |
| | | | | 318/434 |
| 2009/0042688 | A1 | 2/2009 | Itou et al. | |
| 2013/0320747 | A1* | 12/2013 | Ozaki | B60L 15/2009 |
| | | | | 301/6.5 |
| 2017/0001661 | A1 | 1/2017 | Nakamura | |
| 2018/0375506 | A1* | 12/2018 | Tanemura | H03K 17/0822 |

FOREIGN PATENT DOCUMENTS

| | | |
|---|---|---|
| JP | 2005-502545 A | 1/2005 |
| JP | 2009-044871 A | 2/2009 |
| JP | 2016-007975 A | 1/2016 |
| JP | 2017-017898 A | 1/2017 |

OTHER PUBLICATIONS

"About thermal resistance", New Japan Radio Co., Ltd. [online], Sep. 11, 2015, URL: https://www.njr.co.jp/products/semicon/package/thermal.html.

* cited by examiner

WIPER DEVICE

TECHNICAL FIELD

The present disclosure relates to a wiper device.

BACKGROUND ART

At a wiper device that wipes the surface of a windshield glass (a windshield), in a case in which an obstacle such as a clump or snow or the like exists on the windshield glass, the load of the wiper motor that is the drive source of the wiper device increases. As a result, the temperatures of the switching elements of the driving circuit that generates electric power that is supplied to the wiper motor increase, and there is the concern that the switching elements may be damaged by heat.

FETs (Field Effect Transistors) and the like are used as the switching elements of driving circuits. Silicon-based semiconductors that structure FETs are vulnerable to heat.

It is possible to handle overloading by increasing the ratings of the wiper motor and the driving circuit. However, the equipment that structure the wiper devices become large, the manufacturing cost of the wiper device increases, and, moreover, the electric power consumed by the wiper device increases.

Japanese Patent Application Laid-Open (JP-A) No. 2005-502545 discloses a wiper device that reduces the load of a wiper motor by controlling the torque of the main power shaft of the wiper motor in accordance with variations in the transmission ratio due to the linking mechanism of the wiper device.

SUMMARY OF INVENTION

Technical Problem

However, in the method of controlling the wiper device of above-described JP-A No. 2005-502545, no countermeasures to the generation of heat at the driving circuit in a case in which the wiper motor becomes overloaded are carried out. Therefore, in a case in which an obstacle such as a clump of snow or the like exists on the windshield glass, there is the possibility that the driving circuit will be damaged.

The present disclosure provides a wiper device that, without increasing the respective ratings of a wiper motor and a driving circuit, may handle overload and can reduce electric power consumption.

Solution to Problem

A first aspect of the present disclosure is a wiper device including: a power supplying circuit including plural switching elements, the power supplying circuit supplying, to a wiper motor, voltage that has been converted in accordance with switching control of the plural switching elements; a temperature detecting section detecting a temperature relating to a temperature of at least one of the switching elements among the plural switching elements; a current detecting section detecting current flowing to any of the switching elements among the plural switching elements; and a control section that, in a case in which the current detected by the current detecting section exceeds a limit current at the temperature detected by the temperature detecting section, carries out switching control of the switching elements such that the voltage supplied to the wiper motor decreases.

In accordance with the wiper device of the first aspect, in a case in which the current that is detected by the current detecting section exceeds the limit current value at the temperature detected by the temperature detecting section, the voltage that drives the wiper motor is lowered. Due thereto, a wiper device that can handle overload without the respective ratings of the wiper motor and the driving circuit being increased, may be provided, and the electric power consumption may be reduced.

In a second aspect of the present disclosure, in the above-described first aspect, the temperature relating to the temperature of the at least one of the switching elements may be a surface temperature of a case that accommodates the plural switching elements.

In accordance with the wiper device of the second aspect, an overloaded state of the wiper device may be detected on the basis of the case temperature of the switching elements which is easy to detect.

In a third aspect of the present disclosure, in the above-described aspects, the limit current may be computed on the basis of the temperature detected by the temperature detecting section, a maximum allowable temperature of a junction temperature of the switching elements, ON resistance of the switching elements, and thermal resistance between a junction of the switching elements and a case of the switching elements.

In accordance with the wiper device of the third aspect, the limit current value is computed in accordance with the case temperature that is detected by the temperature detecting section. The limit current value is dependent on temperature, and, in a case in which the temperature is high, the limit current value exhibits a declining trend. Therefore, in a case in which the current that is detected by the current detecting section exceeds the limit current value, by carrying out control that lowers the voltage that drives the wiper motor, overloading may be handled, and the consumed electric power can be lowered, without increasing the respective ratings of the wiper motor and the driving circuit.

A fourth aspect of the present disclosure, in the above-described aspects, may include: a storage that stores, in advance, the limit current with respect to the temperature detected by the temperature detecting section.

In accordance with the wiper device of the fourth aspect, the computational load of the control section may be reduced by storing, in advance, limit current values with respect to temperatures that are detected by the temperature detecting section.

A fifth aspect of the present disclosure, in the above-described aspects, may include: a rotational angle detecting section that detects a rotational angle of an output shaft of the wiper motor, wherein, at a time when the current detected by the current detecting section exceeds the limit current, in a case in which a position of a wiper blade expressed by the rotational angle of the output shaft detected by the rotational angle detecting section is within a predetermined region from a predetermined position near a reversal position to the reversal position, the control section may carry out switching control of the switching elements such that the voltage supplied to the wiper motor decreases, and, in a case in which the position of the wiper blade is outside of the predetermined region, the control section may stop supply of voltage to the wiper motor.

In accordance with the wiper device of the fifth aspect, at a time when the current detected by the current detecting section exceeds the limit current value, in a case in which the wiper blade is positioned in a predetermined region that is from a predetermined position, at which it is easy for the wiping operation to be impeded by an obstacle such as a clump of snow or the like, to the reversal position, overheating of the wiper motor can be prevented, while maintaining a wiping performance that can remove obstacles, such as clumps of snow or the like, at the minimum torque. Further, at a time when the current detected by the current detecting section exceeds the limit current value, in a case in which the wiper blade is positioned outside of the predetermined region, it is considered that some type of trouble has arisen at the wiper device, and the supply of electric power to the wiper motor is stopped. Due thereto, damage to the wiper device may be prevented.

DESCRIPTION OF EMBODIMENTS

Figure 1:
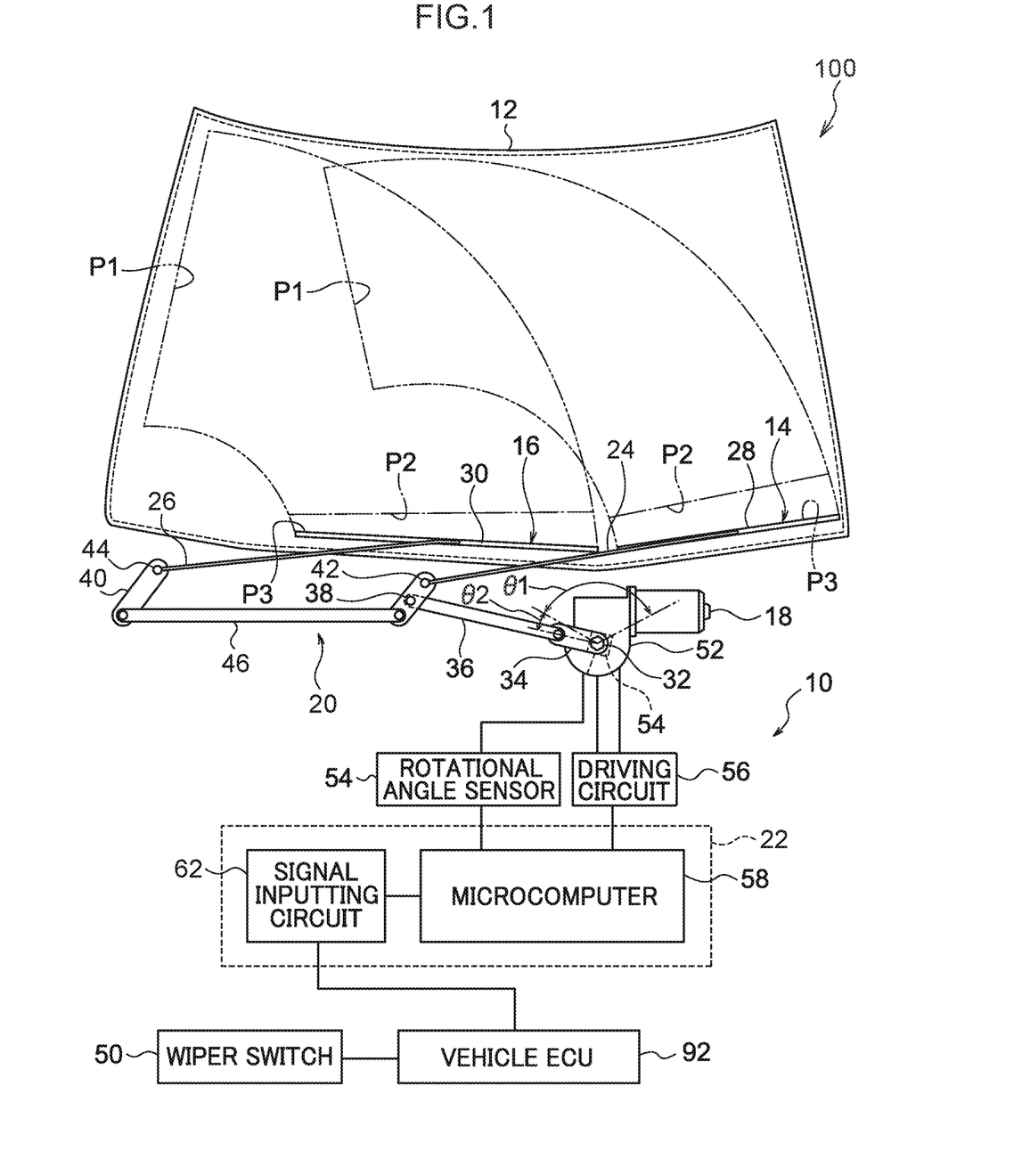
FIG. 1 is a schematic drawing illustrating the structure of a wiper device relating to an exemplary embodiment of the present disclosure.

FIG. 1 is a schematic drawing illustrating the structure of a wiper device 100 relating to an exemplary embodiment of the present disclosure. The wiper device 100 is a device for, for example, wiping a windshield glass 12 that is provided at a vehicle such as a passenger automobile or the like, and has a pair of wipers 14, 16, a wiper motor 18, and a link mechanism 20.

The wipers 14, 16 are structured by wiper arms 24, 26 and wiper blades 28, 30, respectively. The proximal end portions of the wiper arms 24, 26 are fixed to pivot shafts 42, 44, which are described later, respectively. The wiper blades 28, 30 are fixed to the distal end portions of the wiper arms 24, 26, respectively.

At the wipers 14, 16, accompanying the operation of the wiper arms 24, 26, the wiper blades 28, 30 operate reciprocally on the windshield glass 12, and the wiper blades 28, 30 wipe the windshield glass 12.

The wiper motor 18 has an output shaft 32, which can rotate forward and reversely, via a speed reducing mechanism 52 that is mainly structured by a worm gear. The link mechanism 20 has a crank arm 34, a first link rod 36, a pair of pivot levers 38, 40, the pair of pivot shafts 42, 44, and a second link rod 46.

One end side of the crank arm 34 is fixed to the output shaft 32. The another end side of the crank arm 34 is operatably connected to one end side of the first link rod 36. Further, the another end side of the first link rod 36 is operatably connected to a place of the pivot lever 38, which place is toward the end that is different than the end that has the pivot shaft 42. The both ends of the second link rod 46 are operatably connected respectively to the end of the pivot lever 38, which end is different than the end having the pivot shaft 42, and the end of the pivot lever 40, which end corresponds to that end of the pivot lever 38.

The pivot shafts 42, 44 are operatably supported by unillustrated pivot holders that are provided at the vehicle body. The wiper arms 24, 26 are fixed respectively via the pivot shafts 42, 44 to the ends, which have the pivot shafts 42, 44, of the pivot levers 38, 40.

At the wiper device 100 relating to the present exemplary embodiment, in a case in which the output shaft 32 is rotated forward and reversely by rotational angle $\theta1$ of a predetermined range, the rotational force of the output shaft 32 is transmitted via the link mechanism 20 to the wiper arms 24, 26, and, accompanying the reciprocal operation of the wiper arms 24, 26, the wiper blades 28, 30 reciprocally operate between lower reversal positions P2 and upper reversal positions P1 that are on the windshield glass 12. The value of $\theta1$ can be made to be any of various values in accordance with the structure of the link mechanism of the wiper device 100, or the like, and, in the present exemplary embodiment, as an example, is 110°.

At the wiper device 100 relating to the present exemplary embodiment, as illustrated in FIG. 1, there is a structure in which, in a case in which the wiper blades 28, 30 are positioned at stored positions P3, the crank arm 34 and the first link rod 36 form a rectilinear shape.

The stored positions P3 are provided beneath the lower reversal positions P2. Due to the output shaft 32 rotating $\theta2$ from the state in which the wiper blades 28, 30 are at the lower reversal positions P2, the wiper blades 28, 30 operate to the stored positions P3. The value of $\theta2$ can be made to be any of various values in accordance with the structure of the link mechanism of the wiper device 100, or the like, and, in the present exemplary embodiment, as an example, is made to be 10°.

Note that, in a case in which the rotational angle $\theta2$ is "0", the lower reversal positions P2 and the stored positions P3 coincide, and the wiper blades 28, 30 are stopped at the lower reversal positions P2, and are stored.

A wiper motor control circuit 22 for controlling rotation of the wiper motor 18 is connected to the wiper motor 18. The wiper motor control circuit 22 relating to the present exemplary embodiment includes a microcomputer 58. Further, the wiper motor control circuit 22, together with a driving circuit 56 and the like, structure a wiper control device 10.

The microcomputer 58 of the wiper motor control circuit 22 controls the rotation speed of the wiper motor 18 on the basis of the results of sensing of a rotational angle sensor 54 that senses the rotation speed and the rotational angle of the output shaft 32 of the wiper motor 18. The rotational angle sensor 54 is provided within the speed reducing mechanism 52 of the wiper motor 18, and converts a magnetic field (magnetic force) of a sensor magnet, which rotates interlockingly with the output shaft 32, into current and detects the rotation angle.

Because the wiper motor 18 relating to the present exemplary embodiment has the speed reducing mechanism 52 as described above, the rotation speed and the rotational angle of the output shaft 32 are not the same as the rotation speed and the rotational angle of the wiper motor main body. However, in the present exemplary embodiment, since the wiper motor main body and the speed reducing mechanism 52 are structured integrally and inseparably, hereinafter, the rotation speed and the rotational angle of the output shaft 32 are considered to be the rotation speed and the rotational angle of the wiper motor 18.

The microcomputer 58 can compute the position of the wiper blades 28, 30 on the windshield glass 12 from the rotational angle of the output shaft 32 that is detected by the rotational angle sensor 54, and controls the driving circuit 56 such that the rotation speed of the output shaft 32 varies in accordance with that position. The driving circuit 56 is a circuit that, on the basis of control of the wiper motor control circuit 22, generates voltage that is applied to the wiper motor 18. The driving circuit 56 switches the electric power of the battery of the vehicle that is the power supply, and generates voltage that is applied to the wiper motor 18.

Further, a wiper switch 50 is connected to the microcomputer 58 of the wiper motor control circuit 22, via a vehicle ECU (Electronic Control Unit) 92, which carries out control of the engine of the vehicle and the like, and a signal inputting circuit 62. The wiper switch 50 is a switch that turns the electric power, which is supplied from the battery of the vehicle to the wiper motor 18, ON and OFF. The wiper switch 50 can switch among a low-speed operation mode selection position (LOW) of operating the wiper blades 28, 30 at a low speed, a high-speed operation mode selection position (HIGH) of operating the wiper blades 28, 30 at a high speed, an intermittent operation mode selection position (INT) of operating the wiper blades 28, 30 intermittently at a uniform interval, and a stop mode selection position (OFF). Further, the wiper switch 50 outputs command signals for rotating the wiper motor 18 in accordance with the selection positions of the respective modes, to the microcomputer 58 via the vehicle ECU 92 and the signal inputting circuit 62. For example, at the high-speed operation mode selection position, the wiper switch 50 causes the wiper motor 18 to rotate at a high-speed, and, at the low-speed operation mode selection position, the wiper switch 50 causes the wiper motor 18 to rotate at a low speed, and, at the intermittent operation mode selection position, the wiper switch 50 causes the wiper motor 18 to rotate intermittently.

When a signal, which is outputted from the wiper switch 50 in accordance with the selection position of each mode, is inputted to the microcomputer 58 via the vehicle ECU 92 and the signal inputting circuit 62, the microcomputer 58 carries out control that corresponds to the command signal from the wiper switch 50. Concretely, on the basis of the command signal from the wiper switch 50, the microcomputer 58 reads a rotation signal of the output shaft 32 and controls the voltage applied to the wiper motor 18, so that the wiper blades 28, 30 operate at the desired reciprocal wiping period. Note that, as an example, LIN (Local Interconnect Network) is used as the protocol for the communication between the vehicle ECU 92 and the signal inputting circuit 62.

Figure 2:
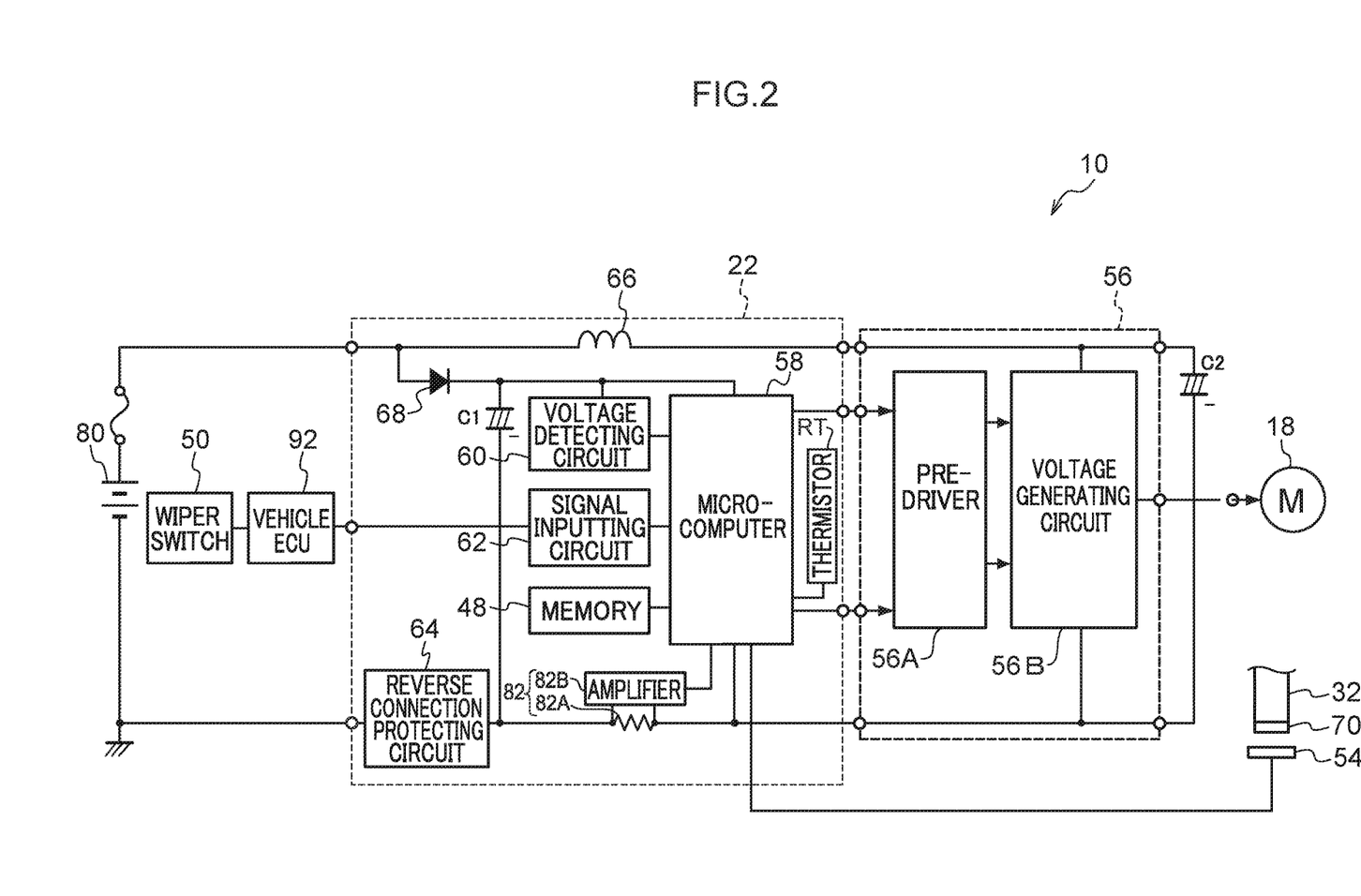
FIG. 2 is a block drawing illustrating an overview of an example of the structure of a wiper control device relating to the exemplary embodiment of the present disclosure.

FIG. 2 is a block drawing illustrating the overview of an example of the structure of the wiper control device 10 relating to the present exemplary embodiment. The wiper control device 10 illustrated in FIG. 2 includes the driving circuit 56 that generates voltage that is applied to the terminal of the coil of the wiper motor 18, and the wiper motor control circuit 22 that has the microcomputer 58 that controls the ON and OFF of the switching elements that structure the driving circuit 56. Electric power of a battery 80 is supplied to the microcomputer 58 via a diode 68, and the voltage of the electric power that is supplied from the battery 80 is sensed by a voltage detecting circuit 60 that is provided between the diode 68 and the microcomputer 58, and the results of sensing are outputted to the microcomputer 58. Further, an electrolytic capacitor C1, whose one end is connected between the diode 68 and the microcomputer 58 and whose another end (−) is grounded, is provided. The electrolytic capacitor C1 is a capacitor for stabilizing the power supply of the microcomputer 58. The electrolytic capacitor C1 protects the microcomputer 58 by, for example, storing sudden high voltage such as a surge or the like, and releases to the ground.

A signal for instructing the rotation speed of the wiper motor 18 is inputted from the wiper switch 50 to the microcomputer 58 via the vehicle ECU 92 and the signal inputting circuit 62.

Further, the rotational angle sensor 54, which senses the magnetic field of a sensor magnet 70 that varies in accordance with the rotation of the output shaft 32, is connected to the microcomputer 58. The microcomputer 58 specifies the position of the wiper blades 28, 30 on the windshield glass 12 by computing the rotational angle of the output shaft 32 on the basis of the signal outputted by the rotational angle sensor 54.

Moreover, the microcomputer 58 refers to data of the rotation speed of the wiper motor 18 that is stored in a memory 48 and is prescribed in accordance with the position of the wiper blades 28, 30, and controls the driving circuit 56 such that the rotation of the wiper motor 18 becomes a rotational frequency that corresponds to the specified position of the wiper blades 28, 30. This data is stored in the memory 48.

The driving circuit 56 includes a pre-driver 56A, which, from the driving circuit 56 control signals that are outputted by the microcomputer 58, generates driving signals that turn the plural switching elements of a voltage generating circuit 56B ON and OFF, and the voltage generating circuit 56B that operates the switching elements in accordance with the driving signals outputted by the pre-driver 56A, and generates voltage that is applied to the coil of the wiper motor 18 from the voltage of the battery 80 (the power supply voltage).

In the present exemplary embodiment, a reverse connection protecting circuit 64 and a noise preventing coil 66 are provided between the battery 80 that is the power supply and the driving circuit 56. An electrolytic capacitor C2 is provided in parallel with the driving circuit 56. The noise preventing coil 66 is an element for suppressing noise that arises due to switching of the driving circuit 56.

The electrolytic capacitor C2 is an element that mitigates noise arising from the driving circuit 56, and that, by storing sudden high voltage such as a surge or the like and releasing it to a ground region, prevents excessive current from being inputted to the driving circuit 56.

The reverse connection protecting circuit 64 is a circuit for protecting the elements that structure the wiper control device 10, in a case in which the positive electrode and the negative electrode of the battery 80 are connected oppositely to the case illustrated in FIG. 2. The reverse connection protecting circuit 64 is, as an example, structured by a so-called diode-connected FET in which its own drain and gate are connected, or the like.

A chip thermistor RT, which senses the case temperature of the switching elements that structure the driving circuit 56 as a resistance value, is packaged on the substrate of the driving circuit 56 of the wiper control device 10 relating to the present exemplary embodiment. The chip thermistor RT that is used in the present exemplary embodiment is, as an example, an NTC (Negative Temperature Coefficient) thermistor whose resistance decreases with respect to an increase in temperature. Note that a PTC (Positive Temperature Coefficient) thermistor, whose resistance value increases as the temperature rises, may be used by also using an inverter circuit together therewith.

The chip thermistor RT structures a type of voltage divider. Voltage, which varies on the basis of the resistance value of the chip thermistor RT, is outputted from the output end of the voltage divider that is structured by the chip thermistor RT. On the basis of the voltage that is outputted from the output end of the voltage divider that is structured by the chip thermistor RT, the microcomputer 58 computes the temperature of the substrate of the wiper control device 10, and, as will be described later, on the basis of this temperature, computes the limit current value of the current (the motor current) of the coil of the wiper motor 18 and the voltage generating circuit 56B. Further, in a case in which the motor current that is detected at the current detecting section 82 exceeds the limit current value, process that lowers the duty ratio of the voltage supplied to the wiper motor 18, or that stops the supply of electric power to the wiper motor 18, is carried out.

A current detecting section 82 for sensing the motor current is provided between the battery 80 and the respective sources of the switching elements that structure the voltage generating circuit 56B. The current detecting section 82 includes a shunt resistor 82A whose resistance value is around 0.2 mΩ to several Ω, and an amplifier 82B that senses the potential difference of the both ends of the shunt resistor 82A, which varies in accordance with the current of the voltage generating circuit 56B, and amplifies the signal of the potential difference that is sensed. The microcomputer 58 computes the current value of the motor current from the signal outputted by the amplifier 82B, and, in a case in which that current value exceeds the limit current value that is described later, carries out processes such as stopping the generation of voltage by the voltage generating circuit 56B, and stopping rotation of the wiper motor 18, and the like.

Figure 3:
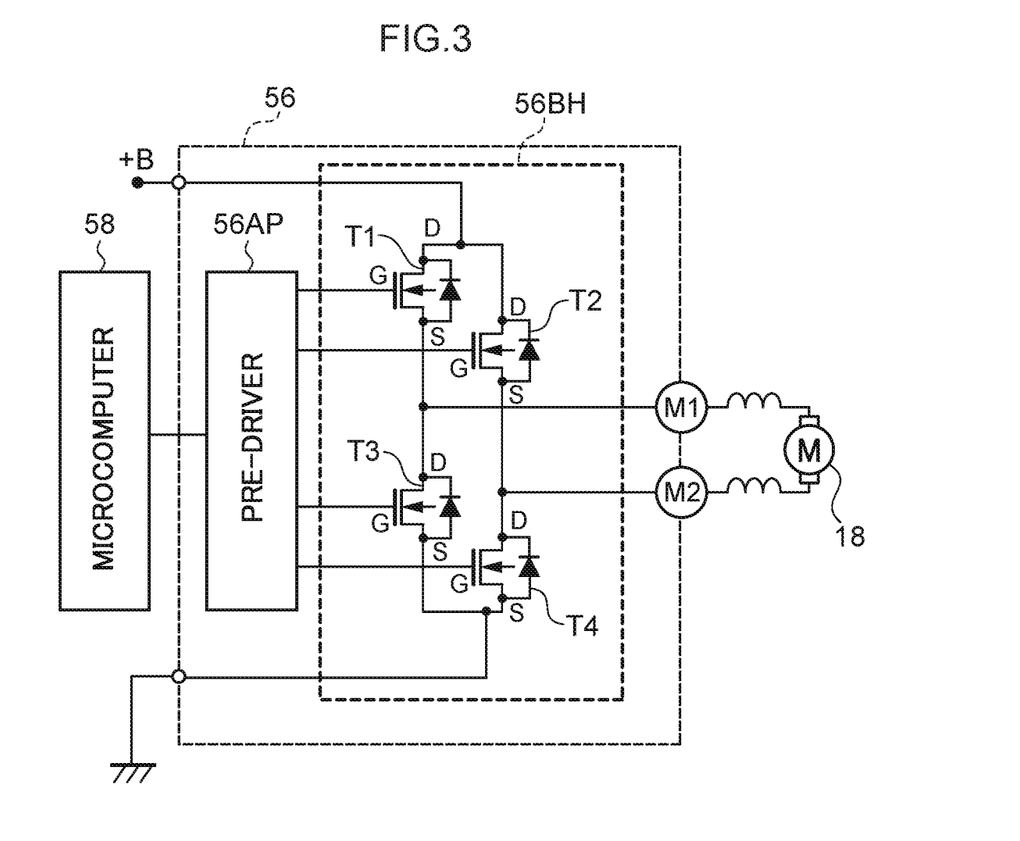
FIG. 3 is a block drawing illustrating an example of a driving circuit in a case in which a wiper motor is a brush motor.

FIG. 3 is a block drawing illustrating an example of the driving circuit 56 in a case in which the wiper motor 18 is a brush motor. The driving circuit 56 has a pre-driver 56AP, which, on the basis of control signals inputted from the microcomputer 58, generates driving signals that operate the switching elements of a voltage generating circuit 56BH, and outputs the driving signals to the voltage generating circuit 56BH, and the voltage generating circuit 56BH that, due to operation of the switching elements based on the driving signals, generates electric power that is supplied to the wiper motor 18.

As illustrated in FIG. 3, the voltage generating circuit 56BH is an H-bridge circuit that uses transistors T1, T2, T3, T4 that are N-type FETs at the switching elements. The drains of the transistor T1 and the transistor T2 are respectively connected to the positive electrode of the battery, and the sources of the transistor T1 and the transistor T2 are connected to the drains of the transistor T3 and the transistor T4, respectively. Further, the sources of the transistor T3 and the transistor T4 are grounded.

The source of the transistor T1 and the drain of the transistor T3 are connected to one end of the coil of the wiper motor 18. The source of the transistor T2 and the drain of the transistor T4 are connected to the another end of the coil of the wiper motor 18.

Due to H-level driving signals being inputted to the respective gates of the transistor T1 and the transistor T4, the transistor T1 and the transistor T4 turn ON, and current, which operates the wiper blades 28, 30 clockwise as seen from the passenger cabin side for example, flows to the wiper motor 18. Moreover, in a case in which one of the transistor T1 and the transistor T4 is controlled to be ON, due to the another being ON/OFF controlled in small increments by PWM, the voltage of this current can be modulated.

Further, due to H-level driving signals being inputted to the respective gates of the transistor T2 and the transistor T3, the transistor T2 and the transistor T3 turn ON, and current, which operates the wiper blades 28, 30 counterclockwise as seen from the passenger cabin side for example, flows to the wiper motor 18. Moreover, in a case in which one of the transistor T2 and the transistor T3 is controlled to be ON, due to the another being ON/OFF controlled in small increments by PWM, the voltage of this current can be modulated.

Figure 4:
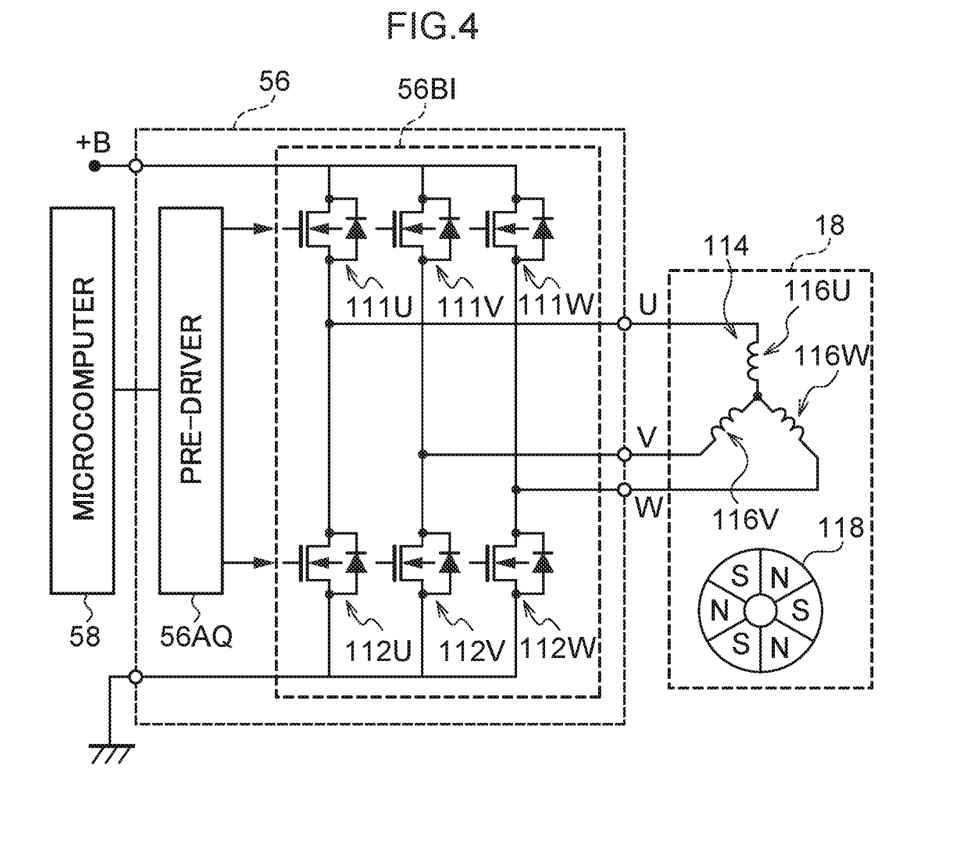
FIG. 4 is a block drawing illustrating an example of a voltage generating circuit in a case in which the wiper motor is a brushless motor.

FIG. 4 is a block drawing illustrating an example of the voltage generating circuit 56B in a case in which the wiper motor 18 is a brushless motor. Voltage generating circuit 56BI is structured by a three-phase (U-phase, V-phase, W-phase) inverter.

In a case in which the wiper motor 18 is a brushless motor, in the rotation control of the wiper motor 18, voltage, which approximates three-phase alternating current of the phases corresponding to the position of the magnetic pole of a permanent magnet of a rotor 118 that rotates, must be generated, and applied to coils 116U, 116V, 116W of a stator 114. A rotating magnetic field that rotates the rotor 118 is generated at the coils 116U, 116V, 116W to which this voltage is applied, and the rotor 118 rotates in accordance with this rotating magnetic field.

Variations in the magnetic field of the rotor 118, or a sensor magnet having a magnetic pole corresponding to the rotor 118, are detected by a Hall sensor (not illustrated) that has a Hall element, or the like, and the microcomputer 58 computes the position of the magnetic pole of the rotor 118 from the detected variations in the magnetic field.

A signal for instructing the rotation speed of the wiper motor 18 (the rotor 118) is inputted from the wiper switch 50 via the vehicle ECU 92 to the microcomputer 58. On the basis of the position of the magnetic pole of the rotor 118, the microcomputer 58 computes the phase of the voltage applied to the coil of the wiper motor 18, and, on the basis of the computed phase and the rotation speed of the rotor 118 instructed from the wiper switch 50, generates control signals that control the voltage generating circuit 56B, and outputs the control signals to a pre-driver 56AQ.

On the basis of the inputted control signals, the pre-driver 56AQ generates driving signals that operate the switching elements of the voltage generating circuit 56BI, and outputs the driving signals to the voltage generating circuit 56BI.

As illustrated in FIG. 4, the voltage generating circuit 56BI has three N-type field effect transistors (FETs) 111U, 111V, 111W (hereinafter called "FETs 111U, 111V, 111W") that respectively serve as upper switching elements, and three N-type field effect transistors (FETs) 112U, 112V, 112W (hereinafter called "FETs 112U, 112V, 112W") that respectively serve as lower switching elements. Note that, in cases in which there is no need to differentiate individually between the respective FETs 111U, 111V, 111W and the respective FETs 112U, 112V, 112W, they are collectively called the "FETs 111" and "FETs 112", and, in a case in which individual differentiation is necessary, the letter "U", "V", "W" is added thereto.

Among the FETs 111 and the FETs 112, the source of the FET 111U and the drain of the FET 112U are connected to the terminal of the coil 116U, and the source of the FET 111V and the drain of the FET 112V are connected to the terminal of the coil 116V, and the source of the FET 111W and the drain of the FET 112W are connected to the terminal of the coil 116W.

The gates of the FETs 111 and the FETs 112 are connected to the pre-driver 56AQ, and driving signals are inputted thereto. In a case in which H-level driving signals are inputted to the gates, the FETs 111 and the FETs 112 enter into ON states, and current flows from the drains to the sources. Further, in a case in which L-level driving signals are inputted to the gates, the FETs 111 and the FETs 112 enter into OFF states, and there becomes a state in which current does not flow from the drains to the sources.

A voltage, which varies in accordance with the position of the magnetic pole of the rotor 118 and which rotates the rotor 118 at the rotation speed instructed by the wiper switch 50, is generated by PWM that turns the respective FETs 111, 112 of the voltage generating circuit 56BI ON and OFF in accordance with the driving signals.

Figure 5:
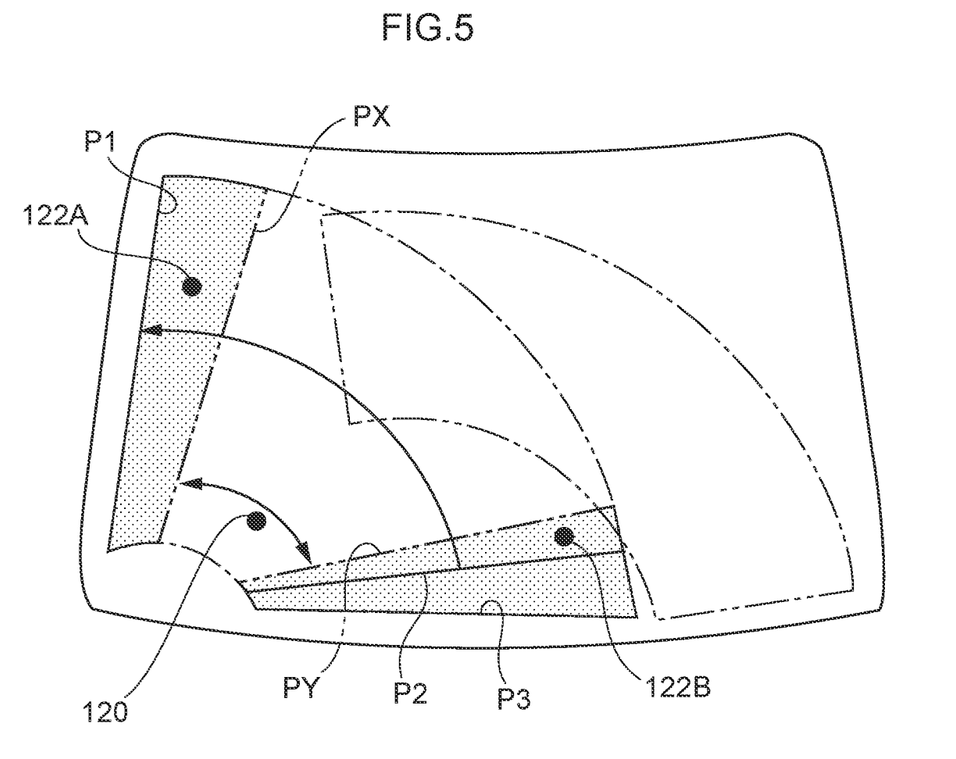
FIG. 5 is an explanatory drawing that illustrates snow clumping regions, at which it is easy for a clump of snow to form, of the wiper device relating to the exemplary embodiment of the present disclosure.

FIG. 5 is an explanatory drawing illustrating snow clumping regions 122A, 122B at which it is easy for clumps of snow to form, of the wiper device 100 relating to the present exemplary embodiment. As illustrated in FIG. 5, the snow clumping region 122A is a region from a predetermined position PX, which is near the upper reversal position P1, to the upper reversal position P1. The snow clumping region 122B is a region from a predetermined position PY, which is near the lower reversal position P2, to the lower reversal position P2. However, clumps of snow hardly form in usual region 120 which is other than the snow clumping regions 122A, 122B. This is because clumps of snow form as a result of snow, which has accumulated at the usual region 120, being swept toward the upper reversal position P1 or the lower reversal position P2 by the wiper blades 28, 30.

Accordingly, impeding of the wiping operations of the wiper blades 28, 30 and overloading of the wiper motor 18 occur often in cases in which the wiper blades 28, 30 exist in the snow clumping region 122A that is from the predetermined position PX, which is close to the upper reversal position P1 but is toward the lower reversal position P2, to the upper reversal position P1, or in the snow clumping region 122B that is from the predetermined position PY, which is close to the lower reversal position P2 but is toward the upper reversal position P1, to the lower reversal position P2.

In the present exemplary embodiment, the limit current value of the motor current is computed on the basis of the temperature detected by the chip thermistor RT. Further, at the time when the motor current that is detected at the current detecting section 82 exceeds the limit current value, in cases in which the wiper blades 28, 30 exist in the snow clumping regions 122A, 122B, the duty ratio of the voltage that is supplied to the wiper motor 18 is lowered, and the load of the wiper motor 18 is reduced. By reducing the load of the wiper motor 18 in this way, in cases in which the wiper blades 28, 30 are positioned in the regions 122A, 122B, overheating of the wiper motor 18 may be prevented while maintaining a wiping performance that may remove obstacles, such as clumps of snow or the like, at the minimum torque. However, in cases in which the wiper blades 28, 30 exist in the usual region, there is a high probability that some type of abnormality has arisen at the wiper device 100, and therefore, process to stop the supply of electric power to the wiper motor 18 is carried out.

In a case in which the switching elements that structure the driving circuit 56 are MOSFETs (Metal Oxide Semiconductor Field Effect Transistors), following formula (1) is established between junction temperature $T_J$ of the MOSFETs, case temperature $T_C$ that is the temperature of the surface of the case (the package) of the MOSFETs, current (motor current) I that flows through the MOSFETs, ON resistance $R_{DS}$ of the MOSFETs, and thermal resistance $R_{THJC}$ between the junction and the case of the MOSFETs.

$$T_J = T_C + I^2 \times R_{DS} \times R_{THJC} \tag{1}$$

Figure 6:
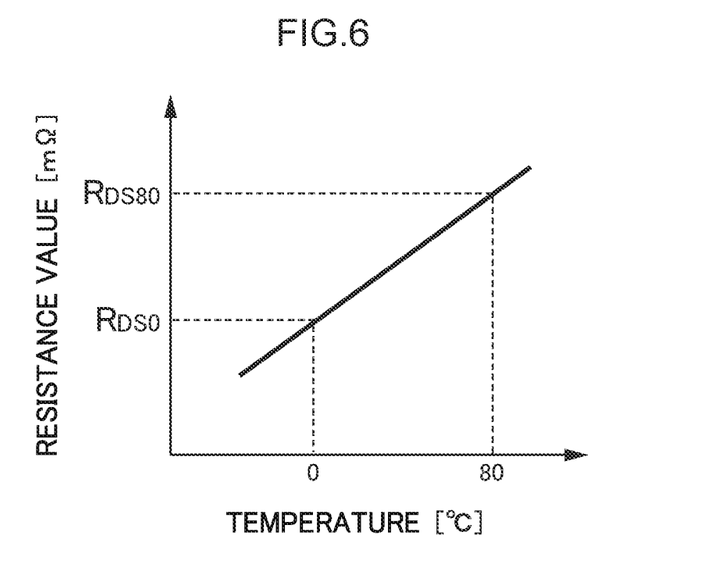
FIG. 6 is a graph illustrating an example of the temperature characteristic of the ON resistance of a MOSFET.

The ON resistance $R_{DS}$ of the MOSFETs that is included in formula (1) is, more concretely, the electrical resistance between the drain and the source of a MOSFET that is in an ON state. The ON resistance $R_{DS}$ of the MOSFETs is not a constant, and is a variable that varies in accordance with temperature. FIG. 6 is a graph illustrating an example of the temperature characteristic of the ON resistance $R_{DS}$ of a MOSFET. As illustrated in FIG. 6, the ON resistance $R_{DS}$ of the MOSFET increases monotonically in accordance with temperature.

Further, in a case in which the chip thermistor RT is provided in a vicinity of the MOSFETs, the temperature that the chip thermistor RT detects (the detected temperature) may be considered to be the case temperature $T_C$ of the MOSFETs. In such a case, the chip thermistor RT detects the case temperature $T_C$ of the MOSFET that is closest. Further, in a case in which the driving circuit 56 that includes plural MOSFETs is made into one package, the chip thermistor RT may be provided in a vicinity of that package, and the detected temperature of the chip thermistor RT may be considered to be the case temperature $T_C$ of the MOSFETs.

In the present exemplary embodiment, the limit current value of the electric power that is supplied to the wiper motor 18 is computed in accordance with the detected temperature, from above formula (1) and the temperature characteristic of the ON resistance $R_{DS}$ of a MOSFET that is illustrated in FIG. 6.

Concretely, in formula (1), the motor current I in a case in which the junction temperature $T_J$ of the MOSFETs is the maximum allowable temperature (175° C. as an example), is computed in accordance with the case temperature $T_C$ (the detected temperature) of the MOSFETs.

Figure 7:
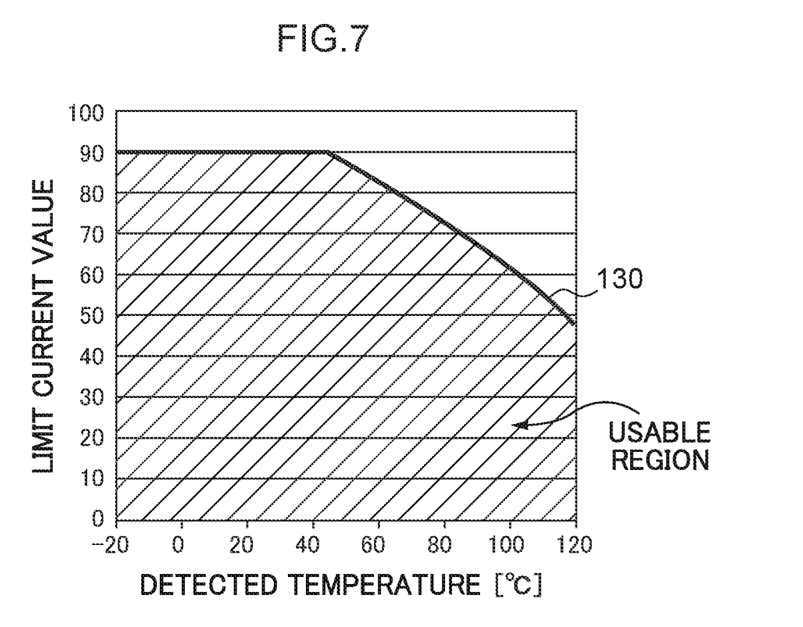
FIG. 7 is a graph illustrating examples of limit current values with respect to detected temperatures.

FIG. 7 is a graph illustrating an example of limit current values 130 with respect to detected temperatures, which is computed on the basis of formula (1). As illustrated in FIG. 7, the limit current value 130 is temperature dependent, and exhibits a declining trend at high temperatures. As will be described later, the limit current value 130 is computed on the basis of the detected temperature of the chip thermistor RT per control cycle of the microcomputer 58, but the limit current values 130 with respect to the detected temperatures may be stored in the memory 48 in advance.

In the present exemplary embodiment, by supplying current, which is in the usable region that is at or below the limit current value 130 illustrated in FIG. 7, to the wiper motor 18, rotation of the wiper motor 18 is controlled such that the junction temperature $R_J$ of the MOSFETs becomes less than the maximum allowable temperature.

Figure 8:
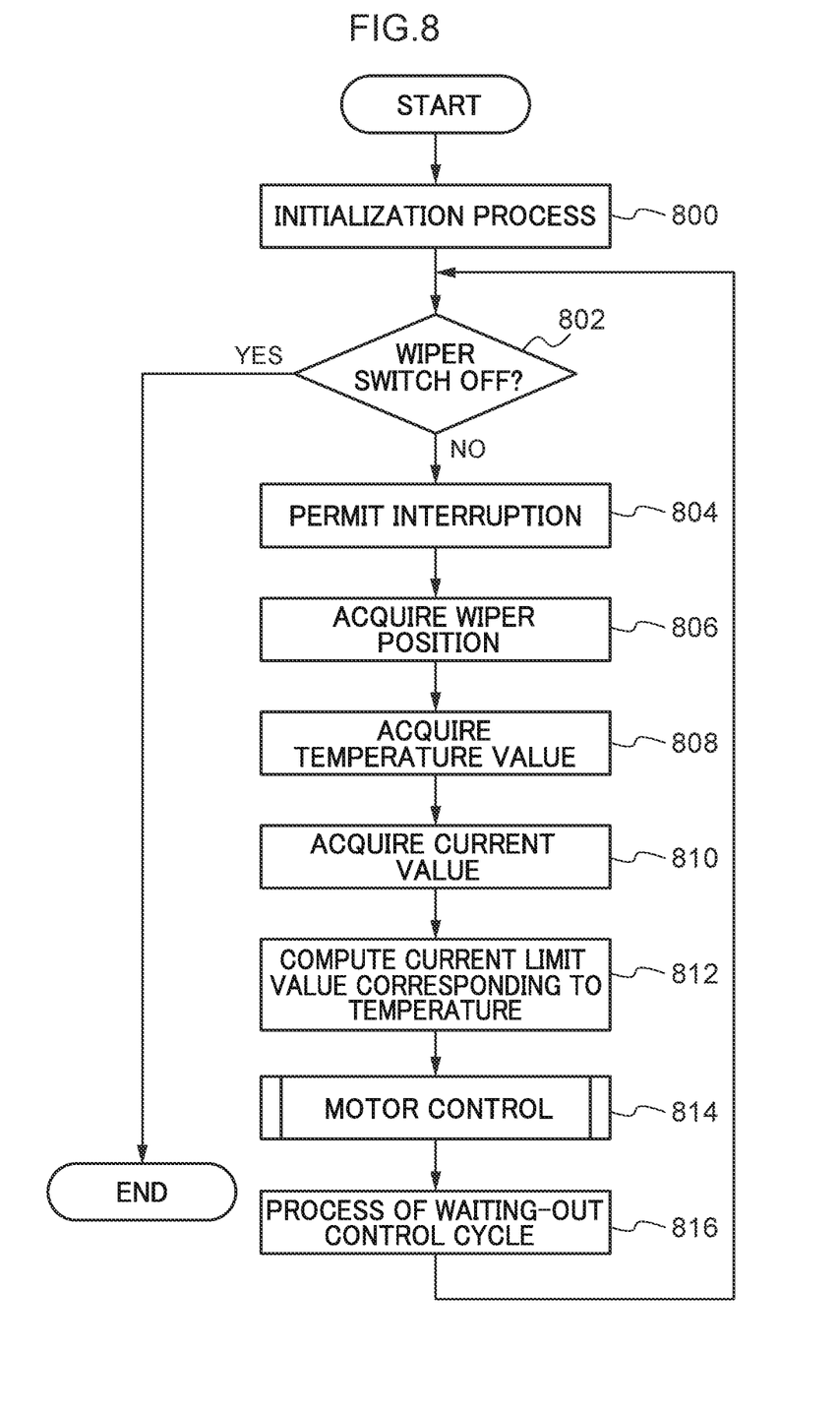
FIG. 8 is a flowchart illustrating an example of main process of control of the wiper device relating to the exemplary embodiment of the present disclosure.

FIG. 8 is a flowchart illustrating an example of the main process of control of the wiper device 100 relating to the present exemplary embodiment. The process of FIG. 8 is started in a case in which the wiper switch 50 is turned ON. In step 800, initialization of the wiper motor control circuit 22 (the microcomputer 58) of the wiper device 100 is carried out. In step 802, it is determined whether or not the wiper switch 50 is OFF. In a case in which the wiper switch is OFF, process is ended, and, in a case in which the wiper switch is ON, in step 804, the allowing of a process of interrupting the microcomputer 58 is carried out.

In step 806, the position of the wiper blades 28, 30 on the windshield glass 12 is computed on the basis of the rotational angle of the output shaft 32 that is detected by the rotational angle sensor 54.

In step 808, the detected temperature that corresponds to the case temperature $T_C$ of the MOSFETs is acquired from the chip thermistor RT. In step 810, the motor current I is acquired from the current detecting section 82.

In step 812, by using above formula (1), the limit current value 130 of the motor current I that corresponds to the detected temperature is computed. In step 814, rotational control of the wiper motor 18, which takes into consideration the limit current value 130 that was computed in step 812, is executed.

In step 816, the process of waiting-out the control cycle is executed, and thereafter, the process returns to step 802.

Figure 9:
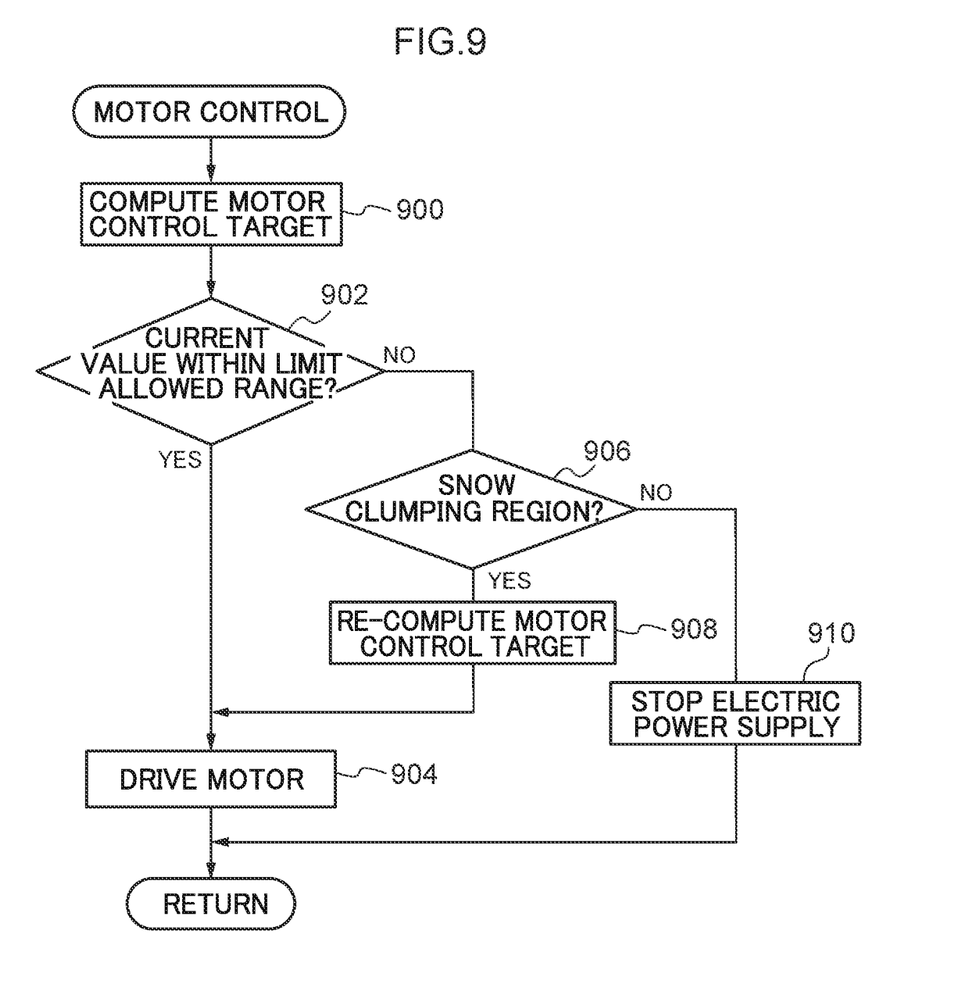
FIG. 9 is a flowchart illustrating the process of step 814 of FIG. 8.

FIG. 9 is a flowchart illustrating the process of step 814 of FIG. 8. In step 900, a motor control target, which is the target value of the rotation speed of the wiper motor 18, is computed on the basis of a command signal that is inputted via the vehicle ECU 92 and the signal inputting circuit 62.

In step 902, it is determined whether or not the motor current I that was detected by the current detecting section 82 is within the limit allowed range, i.e., whether or not the motor current I is at or below the limit current value 130. In a case in which the motor current I is at or below the limit current value 130 in step 902, in step 904, the rotation of the wiper motor 18 is controlled in accordance with the motor control target, and process returns.

In a case in which, in step 902, the motor current I exceeds the limit current value 130, in step 906, it is determined whether or not the position of the wiper blades 28, 30 is in the snow clumping regions 122A, 122B.

In a case in which, in step 906, the position of the wiper blades 28, 30 is in the snow clumping regions 122A, 122B, the motor control target is re-computed in step 908, and the process proceeds to step 904. In the re-computing of the motor control target in step 908, the duty ratio of the voltage that is supplied to the wiper motor 18 is lowered such that the motor current I that is detected by the current detecting section 82 becomes at or below the limit current value 130.

In a case in which, in step 906, the position of the wiper blades 28, 30 is in the usual region 120, there is no overloading due to an obstacle such as a clump of snow or the like, and there is a high probability that some type of trouble with the wiper device 100 has arisen. Therefore, in step 910, the supplying of electric power from the driving circuit 56 to the wiper motor 18 is stopped, and process returns.

As described above, in accordance with the wiper device relating to the present exemplary embodiment, the limit current value 130 of the motor current is computed from the detected temperature of the chip thermistor RT, and the duty ratio of the voltage that is supplied to the wiper motor 18 is controlled such that the motor current that is detected by the current detecting section 82 does not exceed the limit current value. Due thereto, the wiper device 100, which can handle overload without increases in the respective ratings of the wiper motor 18 and the driving circuit 56, may be provided.

Further, in accordance with the wiper device 100 relating to the present exemplary embodiment, even in a case in which the respective ratings of the wiper motor 18 and the driving circuit 56 are low, the wiper motor 18 and the driving circuit 56 respectively entering into overloaded states may be avoided, and therefore, compactness of and a lowering of cost of the manufactured product are possible. Moreover, by making the ratings be low, the electric power consumed by the manufactured product may be reduced.

The disclosure of Japanese Patent Application No. 2018-087552 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A wiper device comprising:
a power supplying circuit including a plurality of switching elements, the power supplying circuit supplying, to a wiper motor, voltage that has been converted in accordance with switching control of the plurality of switching elements;
a thermistor detecting a temperature relating to a temperature of at least one of the switching elements among the plurality of switching elements;
a current detector detecting current flowing to any of the switching elements among the plurality of switching elements;
a rotational angle detector that detects a rotational angle of an output shaft of the wiper motor; and
a microcomputer that, in a case in which the current detected by the current detector exceeds a limit current at the temperature detected by the thermistor, carries out switching control of the switching elements such that the voltage supplied to the wiper motor decreases,
wherein, at a time when the current detected by the current detector exceeds the limit current, in a case in which a position of a wiper blade expressed by the rotational angle of the output shaft detected by the rotational angle detector is within a predetermined region from a predetermined position near a reversal position to the reversal position, the microcomputer carries out switching control of the switching elements such that the voltage supplied to the wiper motor decreases, and, in a case in which the position of the wiper blade is outside of the predetermined region, the microcomputer stops supply of voltage to the wiper motor.

2. The wiper device of claim 1, wherein the temperature relating to the temperature of the at least one of the switching elements is a surface temperature of a case that accommodates the plurality of switching elements.

3. The wiper device of claim 1, wherein the limit current is computed on the basis of the temperature detected by the thermistor, a maximum allowable temperature of a junction temperature of the switching elements, ON resistance of the switching elements, and thermal resistance between a junction of the switching elements and a case of the switching elements.

4. The wiper device of claim 1, comprising a storage that stores, in advance, the limit current with respect to the temperature detected by the thermistor.

* * * * *